United States Patent [19]

Kobayashi

[11] Patent Number: 4,979,691
[45] Date of Patent: Dec. 25, 1990

[54] CONTACT PRINTER

[75] Inventor: Toshiharu Kobayashi, Tokyo, Japan

[73] Assignee: Sony Corporation, Tokyo, Japan

[21] Appl. No.: 423,755

[22] Filed: Oct. 18, 1989

[30] Foreign Application Priority Data

Oct. 22, 1988 [JP] Japan .................... 63-266443

[51] Int. Cl.$^5$ .................. G11B 5/86; G11B 15/48
[52] U.S. Cl. ................... 242/75.51; 242/75.5; 242/75.45; 242/75.47; 318/7; 360/17
[58] Field of Search ............ 242/75.5, 75.51; 360/16, 17; 318/6, 7; 292/75.45, 75.47, 186

[56] References Cited

U.S. PATENT DOCUMENTS

| 4,338,645 | 7/1982 | Mohri et al. | 242/75.51 X |
| 4,561,608 | 12/1985 | O'Gwynn et al. | 242/186 |
| 4,752,842 | 6/1988 | Odagiri | 360/17 X |
| 4,755,888 | 7/1988 | Hori et al. | 360/16 |
| 4,773,616 | 9/1988 | Abe | 242/75.51 X |
| 4,777,413 | 10/1988 | Yoshimura et al. | 242/75.51 |

Primary Examiner—Stuart S. Levy
Assistant Examiner—Steven M. DuBois
Attorney, Agent, or Firm—Lewis H. Eslinger; Jay H. Maioli; Donald S. Dowden

[57] ABSTRACT

A magnetic tape contact printing apparatus includes a rotational transfer drum for driving a copy tape in intimate contact with a mother tape on which information signals are recorded, these information signals being transferred from the mother tape to the copy tape. The apparatus also includes a sensor for sensing the rotational speed of the rotational transfer drum, a pair of reel discs each mounting a copy tape supply reel and a copy tape take-up reel about which the copy tape is wound, and a pair of reel disc motors for driving the reel discs. A pair of tensioning devices respectively tension the copy tape running between the copy tape supply reel and the rotational transfer drum and between the latter and the copy tape take-up reel. Tension sensors sense the tension applied to the copy tape by the tensioning devices, and a controller drive-controls the reel disc motors on the basis of the tension sensed by the tension sensors and the rotational acceleration of the rotational transfer drum computed from the rotational speed sensed by the drum speed sensor. In accordance with the invention, this enables the tension applied to the tapes at the time of starting and stopping of rotation of the rotational transfer drum to be maintained at a predetermined value.

7 Claims, 4 Drawing Sheets

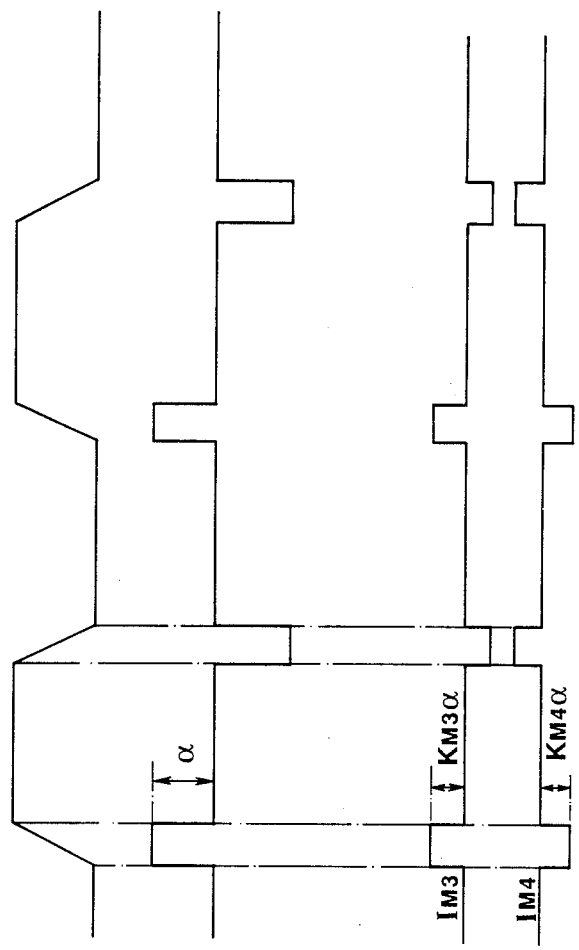

CONTACT PRINTER

BACKGROUND OF THE INVENTION

1. Field of the Invention

This invention relates to a magnetic tape contact printing apparatus for transferring information signals recorded on a mother tape to a copy tape. More particularly, it relates to a magnetic tape contact printing apparatus in which rotation of two pairs of reels about which the mother tape and the copy tape are respectively wound is controlled by a controller on the basis of rotational acceleration of a rotational transfer drum adapted to drive the tapes, so that the tension applied to the tapes at the time of starting and stopping of rotation of the rotational transfer drum is maintained at a predetermined value.

2. Description of the Prior Art

There has been proposed a magnetic tape contact printing apparatus in which the copy tape is brought into intimate contact with the mother tape for transferring information signals recorded on the mother tape to the copy tape.

In such magnetic tape contact printing apparatus, the mother tape is wound on a mother tape supply reel and taken up from this mother tape supply reel on a mother tape take-up reel by way of a contact printing section. The copy tape is wound on a copy tape supply reel and taken up from this copy tape supply reel on a copy tape take-up reel by way of the contact printing section.

The contact printing section has a transfer bias head and a rotational transfer drum, and the two tapes are adapted to run between the bias head and the drum in an overlapping relation to each other. Thus, in this contact printing section, the mother tape and the copy tape are brought into intimate contact with each other. During contact printing, these tapes are driven by rotation of the rotational transfer drum, and an A.C. bias magnetic field of a predetermined frequency is applied to the tapes by the transfer bias head. The information signals are transferred in this manner from the mother tape onto the copy tape.

In the above described magnetic tape contact printing apparatus, a tension servo control system is included for preventing tape destruction, such as tape breakage, caused by the increase in tension of the mother tape and the copy tape. This control system operates in such a manner that the tension applied to the tapes is sensed and the driving or braking of the reels about which the tapes are wound is controlled by a controller on the basis of the sensed results.

In the operation of the tension servo control system, there have been proposed, as means for applying tension to the tapes and sensing such tension, means including tension arms supported for rotation and biased to be turned in a predetermined direction and angular sensors for sensing the rotational positions of these tension arms.

For effecting high speed and efficient transfer of the information signals in the above described contact printing apparatus, it is necessary to accelerate or decelerate the transfer drum rapidly at the time of starting and stopping of transfer of the information signals.

However, when the transfer drum is accelerated or decelerated rapidly, each tape experiences rapid fluctuations in tape tension, so that there arises the risk that the tension sensors, such as the aforementioned tension arms, cannot follow the changes in tape tension. When the tension sensors cannot follow the changes in tape tension, the tape tension cannot be maintained at a prescribed value but may be increased excessively to cause tape rupture. The copy tape is especially likely to be ruptured because it has less thickness and tensile strength than the mother tape.

OBJECTS AND SUMMARY OF THE INVENTION

It is an object of the present invention to provide a magnetic tape contact printing apparatus wherein the information signals recorded on the mother tape may be transferred to the copy tape at a higher speed and with higher efficiency.

It is another object of the present invention to provide a magnetic tape contact printing apparatus wherein, in order to prevent rupture of the mother and copy tapes, the tape tension of the mother tape and the copy tape may be maintained at a predetermined value despite rapid acceleration and deceleration at the time of starting and stopping of rotation of the rotational transfer drum that drives the tapes.

For accomplishing the above objects, the present invention provides a tension controller for a contact printing apparatus comprising: a first reel motor for driving a first reel, a second reel motor for driving a second reel, a third reel motor for driving a third reel, a fourth reel motor for driving a fourth reel, a mother tape wound about and adapted to run between the first reel and the second reel, a copy tape wound about and adapted to run between the third reel and the fourth reel, a rotational transfer drum on which the mother tape and the copy tape are driven together and which defines their travelling speed, a rotation sensor attached to the rotational transfer drum for deriving the acceleration of the rotational transfer drum, a tension sensor cooperating at least with the copy tape between the rotational transfer drum and the fourth tape reel for deriving a tape tension thereof, and means for supplying a driving current to the fourth motor based on the detected tape tension and the acceleration of the rotational transfer drum.

The controller of the contact printing apparatus according to the present invention controls rotation of the reel disc motors on the basis of the tape tension and the rotational acceleration of the rotational transfer drum adapted to drive the tapes, so that, when the drum is accelerated or decelerated rapidly, the reel discs are correspondingly accelerated or decelerated rapidly to maintain the tape tension at a predetermined constant value.

In accordance with the invention, additional features may be provided including a tape diameter detector cooperating with the copy tape wound on the fourth tape reel to detect the diameter thereof, the acceleration information being corrected on the basis of the detected diameter of the copy tape wound on the fourth reel. Other reels, including particularly the third reel, may similarly cooperate with a tape diameter detector for a similar purpose. Also, additional tension sensors may be provided cooperating with the copy tape between the rotational transfer drum and the third tape reel for deriving a tape tension thereof, and cooperating with the mother tape between the rotational transfer drum and the first and second tape reels, respectively, for deriving respective tape tensions thereof. The driving currents for the first, second, third and fourth motors may be controlled additionally or corrected in accordance with the additional information made available by these additional sensors.

BRIEF DESCRIPTION OF THE DRAWINGS

FIGS. 4A through 4D constitute a time chart illustrating the operation of a controller of the contact printing apparatus.

DESCRIPTION OF THE PREFERRED EMBODIMENTS

Figure 1:
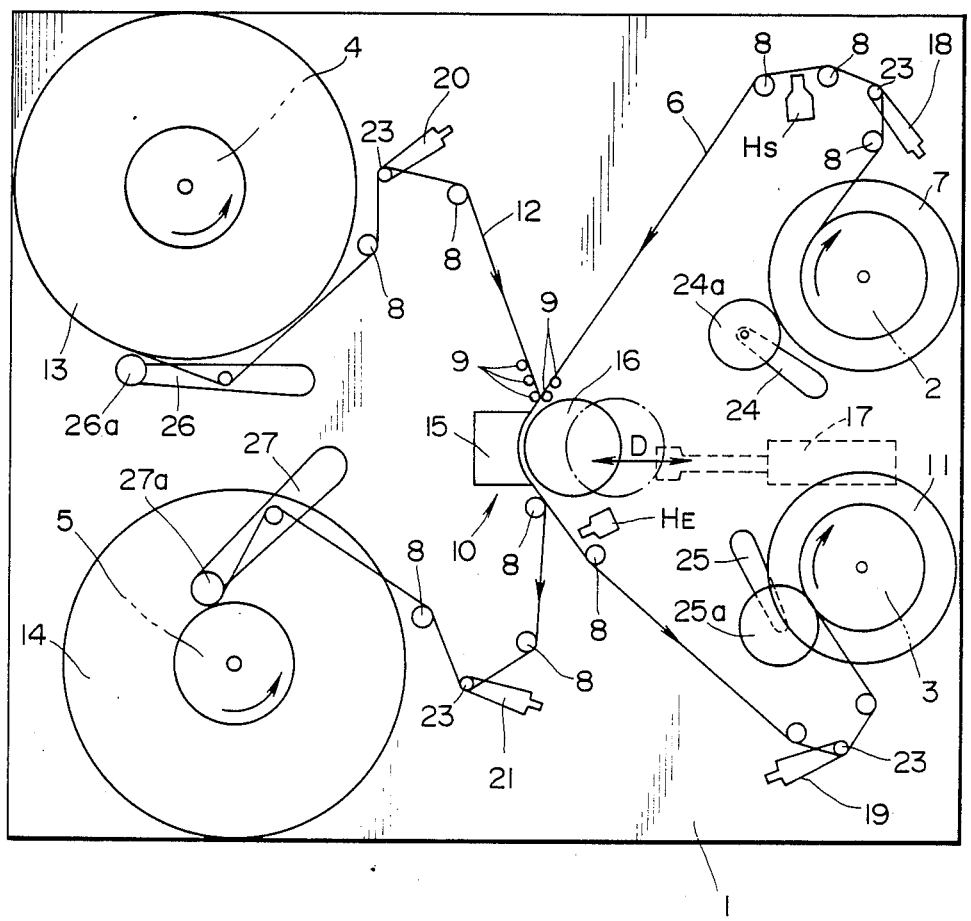
FIG. 1 is a front view showing the construction of the magnetic tape contact printing apparatus according to the present invention.

The magnetic tape contact printing apparatus according to the present invention is shown in FIG. 1 and includes a chassis 1 which is provided with first to fourth reel discs 2, 3, 4 and 5. First to fourth reel disc electric motors $M_1$, $M_2$, $M_3$ and $M_4$ (FIG. 3) are operatively associated with these reel discs 2, 3, 4 and 5, respectively, for rotationally driving the associated reel discs.

On the first reel disc 2, there is mounted a mother tape supply reel 7, and a mother tape 6, on which predetermined information signals are previously recorded and which serves as the master magnetic tape, is wound on the supply reel 7. During the contact copy or transfer mode, the mother tape 6 is guided by roll guides 8 and stationary guides 9 provided on the chassis 1 to pass through a contact printing section 10 so as to be taken up on a mother tape take-up reel 11 formed on the second reel disc 3.

On the third reel disc 4, there is mounted a copy tape supply reel 13. A copy tape 12, onto which the information signals recorded on the mother tape 6 is to be copied or transcribed by contact printing, is wound on the supply reel 13. The length of the copy tape 12 is selected so that the data signals recorded on the mother tape 6 can be recorded continuously about 100 times, for example, on end. During the contact printing mode, the copy tape 12 is guided by plural roll guides 8 and stationary guides 9 to pass through the contact printing section 10 in an overlapping relation with the mother tape 6 so as to be taken up on a copy tape take-up reel 14 formed on the fourth reel disc 5.

Figure 3:
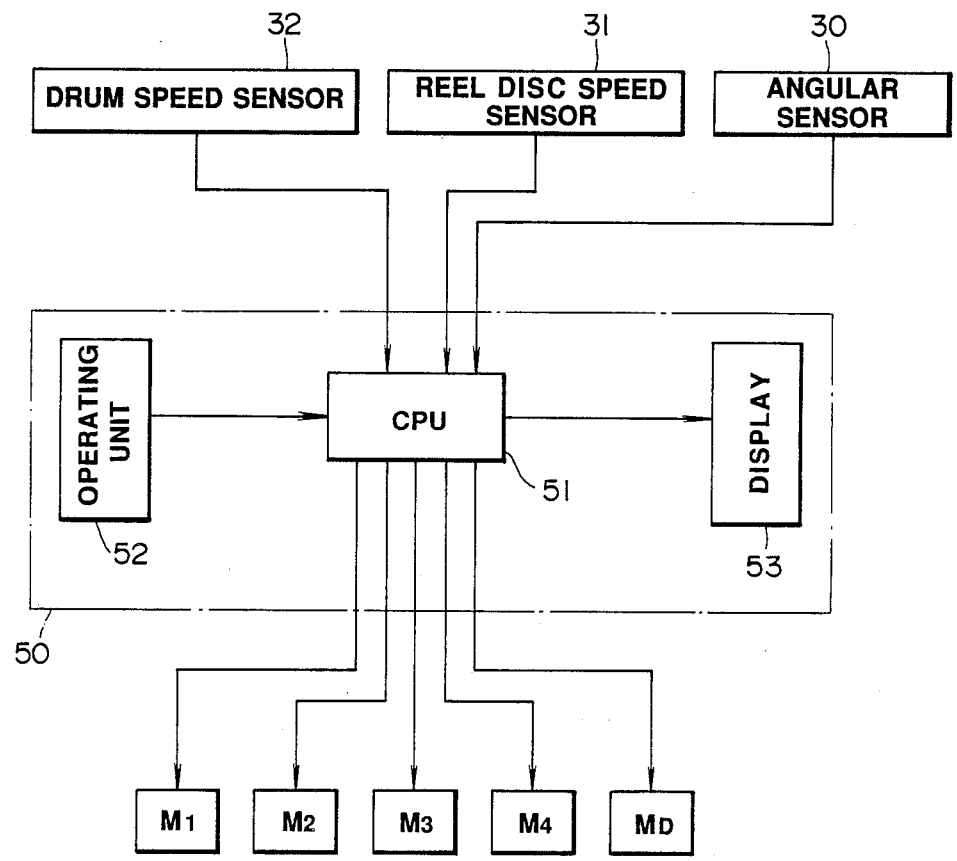
FIG. 3 is a schematic block diagram showing the construction of the controller of the magnetic tape contact printing apparatus.

The contact printing section 10 has a contact printing bias head 15 and a rotatable contact printing drum 16. The tapes 6 and 12 are adapted to travel between the head 15 and drum 16. The contact printing bias had 15 is adapted to produce an A.C. bias magnetic field of a predetermined frequency to effect contact printing of the information signals from the mother tape 6 to the copy tape 12. The contact printing drum 16 is driven in rotation by a drum motor $M_D$ (FIG. 3) and adapted to position the running tapes 6 and 12 with respect to the bias head 15 and drive the tapes 6 and 12. As FIG. 3 shows, the drum motor $M_D$ is provided with, for example, a rotary encoder or a drum speed sensor 32, such as a so-called FG, for sensing the rotation speed of the drum 16. The contact printing drum 16 may be brought into and away from the contact printing bias head 15 by a plunger 17, as suggested by an arrow mark D in FIG. 1. Air blowout ports, not shown, are provided on both sides of a magnetic gap of the bias head 15. During the contact printing mode, air is ejected via these blowout ports for bringing the tapes 6 and 12 into pressure contact with the contact printing drum 16.

The motors $M_1$, $M_2$, $M_3$, $M_4$ and $M_D$, the contact printing bias head 15, and the plunger 17 are controlled by a controller 50, as shown in FIG. 3.

Figure 2:
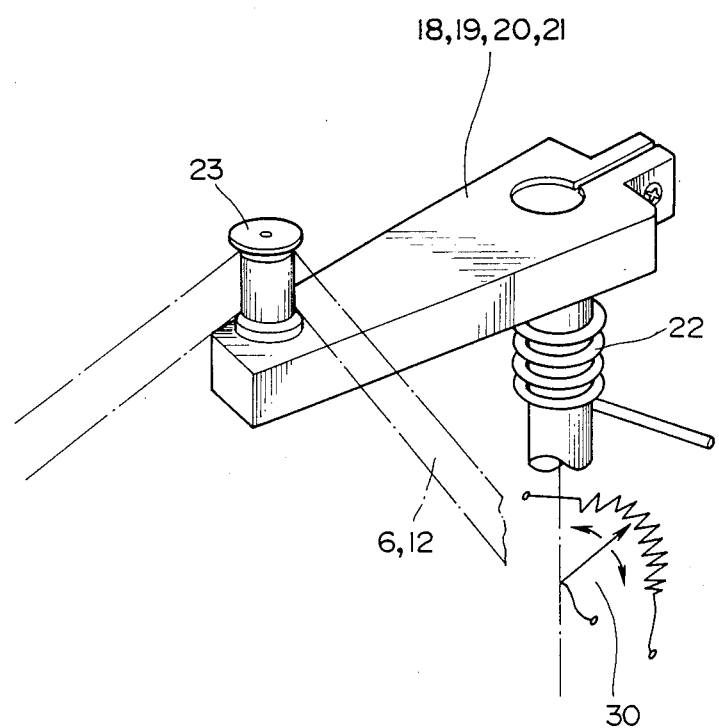
FIG. 2 is a enlarged perspective view showing the construction of a part of the apparatus shown in FIG. 1.

On the chassis 1, there are provided first to fourth tension arms 18, 19, 20 and 21, operating as tensioning means for applying predetermined tension to the tapes 6 and 12. These tension arms 18, 19, 20 and 21 are operatively associated with the respective reel discs 2, 3, 4 and 5, and are adapted to pull the tapes running between the associated reel discs and the contact printing section 10 in a predetermined direction. As shown in FIG. 2, each of the tension arms 18, 19, 20 and 21 has its proximal end turnably fulcrumed and biased by a tension spring 22 so as to be turned in a predetermined direction. A guide member 23 for guiding the magnetic tape is provided at the distal end of each of the arms 18 to 21. An angular sensor 30, such as potentiometer, is provided at the proximal end of the tension arm, operating as the tension sensor, for sensing the turning position of the tension arm. The output of the angular sensor 30 is transmitted to the controller 50, as shown in FIG. 3.

On the chassis 1, there are provided first to fourth touch roll arms 24, 25, 26 and 27 (FIG. 1), in operative association with the reel discs 2, 3, 4 and 5, respectively. Each of these touch roll arms 24 to 27 has its proximal end turnably fulcrumed and is provided at its distal end with touch rolls 24a, 24a, 26a and 27a of approximately the same width as the tape 6 or 12. An angular sensor 30, such as the potentiometer shown in FIG. 2, is provided at the proximal end of each touch roll arm for sensing the swing position of the associated touch roll arm. The output of each angular sensor 30 is transmitted to the controller 50. A bias device, such as a plunger, is also provided at the proximal end of each touch roll arm. This bias device operates on the basis of the sensed result of the angular sensor in such a manner that, when the touch roll arm is closer to the associated reel disc than a predetermined angular position, it biases the touch roll arm towards the associated reel disc and, when the touch roll arm is farther away from the associated reel disc than the predetermined angular position, it biases the touch roll arm in a direction away from the associated reel disc.

As FIG. 3 shows, the controller 50 includes a signal processing unit (CPU) 51, an operating unit 52, and a display 53 and functions to make a changeover between the various modes in dependence upon detection signals transmitted thereto from the angular sensors 30 and the manipulation on the operating unit 52, as well as to drive-control the various motors $M_1$, $M_2$, $M_3$, $M_4$ and $M_D$.

In the above described magnetic tape contact printing device of the present invention, upon actuation of the operating unit 50, with the turning on of the power source, a threading mode is set. This threading mode is one in which the copy tape supply reel 13, or so-called pancake type reel, wound with the copy tape 12, is attached to the third reel disc 4 and the starting end of the copy tape 12 is passed through a predetermined tape path and engaged with a hub of the copy tape take-up reel 14.

Meanwhile, in this threading mode, the contact printing drum 16 has been shifted by the plunger 17 to a position away from the contact printing bias head 15.

When the operating unit 52 is actuated to establish the contact printing mode, the drum 16 is shifted towards the head 15, and tension servo control comes into operation with respect to the first to fourth reel discs 2 to 5.

This tension servo control involves a servo control operation in which the reel disc motors $M_1$, $M_2$, $M_3$ and $M_4$ are drive-controlled for establishing the predetermined angular positions of the tension arms 18, 19, 20 and 21. Each of the tension arms 18, 19, 20 and 21 has been turned under the bias of the associated tension spring 22. Thus, depending on the angular position of the tension arms 18, 19, 20 and 21, the spring bias by the tension spring 22, that is, the force of tension acting on the mother tape 6 or the copy tape 12, is changed. The angular position of the tension arms 18, 19, 20 and 21 is changed as a function of the adjustable length of the mother tape 6 or the copy tape 12 between the contact printing section 10 and the reels 7, 11, 13 and 14 associated with the tension arms 18, 19, 20 and 21, respectively. Therefore, if the angular position of each of the tension arms 18 to 21 is maintained constant by maintaining the adjustable lengths of the mother tape 6 and the copy tape 12 constant, the tension applied to the mother tape 6 and the copy tape 12 may be rendered constant.

It is noted the tension arms 18, 19, 20 and 21 control the electrical motor $M_1$ for the reel disc 2, the electric motor $M_2$ for the reel disc 3, the electric motor $M_3$ for the reel disc 4 and the electric motor $M_4$ for the reel disc 5, respectively.

The signal processing unit 51 of the controller 50 determines and controls the electric current I supplied to each of the reel disc motors $M_1$ to $M_4$. Such control is made on the basis of the deviation from the predetermined angular position of the tension arms 18, 19, 20 and 21 associated with the reel disc motors $M_1$, $M_2$, $M_3$ and $M_4$, respectively, that is, tension servo error $T_E$, and the differential angle between the unbiased position and the aforementioned predetermined position of the tension arms, that is, tension offset $T_O$. Thus the relation $$I\alpha(TE+TO) \quad \ldots (1)$$

is satisfied. The tension servo error $T_E$ and the tension offset $T_O$ in equation (1) are computed on the basis of the angular position of the associated tension arm sensed by the angular sensor 30.

Thus, in the present contact printing mode, when the tape tension from the reels 7, 11, 13 and 14 attached to the reel discs 2, 3, 4 and 5 to the contact printing section 10 is larger than a predetermined tension, the signal processing unit 51 drive-controls the reel disc motor corresponding to the larger tension to maintain a uniform tape tension, as by weakening the take-up drive force applied to the associated reel or weakening the braking force on the supply side.

Also, when the tape tension from the reels 7, 11, 13 and 14 to the contact printing section 10 is lower than the predetermined tension, the signal processing unit 51 drive-controls the reel disc motor corresponding to the lower tension so as to take up the tape on the associated reel.

In this manner, the tension on the mother tape 6 or the copy tape 12 from the reels 7, 11, 13 and 14 to the contact printing section 10 may be maintained constant.

On the initiation of the contact printing operation, the contact printing bias head 15 is actuated, and the contact printing drum 16 is shifted by the plunger 17 to a position close to the contact printing bias head 15. Then, rotational driving of the contact printing drum 16 is started by the drum motor $M_D$. With the start of rotation of the contact printing drum 16, running of the tapes 6 and 12 in the predetermined directions is started.

Meanwhile, in the take-up reels 11 and 14 adapted to take up the tapes 6 and 12, the second and the fourth touch roll arms 25 and 27 are biased towards the associated take-up reels 11 and 14, respectively, to retain the wound tapes by the touch rolls 25a and 27a to prevent loose winding.

It is noted that, when the rate of speed increase or acceleration of the contact printing drum 16 is high at the starting time of running of the tapes 6 and 12, tape tension for the tapes 6 and 12 is increased rapidly on the side of the supply reels 7 and 13 and decreased rapidly on the side of the take-up reels 11 and 14. Conversely, when the rate of speed decrease or deceleration of the contact printing drum 16 is high at the time of cessation of running of the tapes 6 and 12 following the end of contact printing of data signals recorded on the mother tape 6, tape tension for the tapes 6 and 12 is decreased rapidly on the side of the supply reels 7 and 13 and increased rapidly on the side of the take-up reels 11 and 14.

In case of such rapid changes in the tape tension, the tension arms 18, 19, 20 and 21 cannot instantaneously follow the associated tension changes of the tapes 6 and 12. However, in accordance with the invention, not only the data of the angular position of the tension arms, as sensed by the angular sensor 30, but also the data of the rotational speed of the contact printing drum 16, as sensed by the drum speed sensor 32, are supplied to the signal processing unit 51, as shown in FIG. 3. The signal processing unit 51 controls the current I supplied to the reel disc motors $M_1$, $M_2$, $M_3$ and $M_4$, on the basis not only of the tension servo error $T_E$ and the tension offset $T_O$, but also of the rate of increase of the rotational speed, namely the rotational acceleration $\alpha$, of the contact printing drum 16, computed on the basis of the rotational speed of the contact printing drum 16. That is, the following formula (2), $$I\alpha(T_E+T_O+k \times \alpha) \quad \ldots (2)$$

in which k is an acceleration coefficient, is satisfied. Thus, even when the contact printing drum 16 is accelerated or decelerated rapidly, the reel disc motors $M_1$, $M_2$, $M_3$ and $M_4$ are rapidly driven into rotation, in dependence upon the acceleration or deceleration of the contact printing drum 16 to reel out or take up the tapes 6 and 12 rapidly without causing changes in the tape tension.

The acceleration coefficient k in the above formula (2) is determined by such factors as the initial moment of each of the reels 7, 11, 13 and 14 mounted on the reel discs 2, 3, 4 and 5, respectively, and the outside diameter of each of the tapes wound on these reels.

FIGS. 4A through 4D show the relation between the rotational speed of the contact printing drum 16 and the driving current supplied to the reel disc motors $M_3$ and $M_4$.

FIG. 4A shows the rotational speed of the contact printing drum 16; FIG. 4B shows the acceleration of the drum 16; FIG. 4C shows the driving current supplied to the motor $M_3$; and FIG. 4D shows the driving current supplied to the motor $M_4$.

As shown in FIGS. 4A through 4D, on the side of the supply reels 7 and 13 (FIG. 1), the acceleration coefficient k assumes a positive value or a negative value when the acceleration α of the contact printing drum 16 is positive or negative, respectively. On the other hand, on the side of the take-up reels 11 and 14, the acceleration coefficient k assumes a negative value or a positive value when the acceleration of the contact printing drum 16 is positive or negative, respectively.

Contact printing of the data signals is performed about 100 times, for example, on one copy tape 12. In order to effect such contact printing, the copy tape 12 starts and stops repeatedly, whereas the mother tape 6 starts, stops and rewinds repeatedly. That is, from the time of contact printing at the leading end of the copy tape 12 until the time of contact printing at the terminal end of the copy tape 12, the copy tape 12 is transferred in its entirety from the copy tape supply reel 13 to the copy tape take-up reel 14. Thus the outside diameter of the copy tape 12 on each of the reels 13 and 14 about which the tape 12 is wound is changed gradually. The acceleration coefficient k will of course change with changes in the outside diameter of the tape wound on the reels 13 and 14.

That is, at the time of a first contact printing of the data signals at the leading end of the copy tape 12, the signal processing unit 51 controls the current $I_1$ supplied to the reel disc motors $M_3$ and $M_4$ in accordance with the following formula (3), which is similar to the above formula (2):

$$I_1 \alpha (T_E + T_O + k_1 \times a) \qquad \ldots (3)$$

When starting this first contact printing, the signal processing unit 51 senses a variable $\Delta\theta_1$ of the angular position of each of the tension arms 20 and 21, and computes a corrective value $A_1$ associated with the variable $\Delta\theta_1$.

When starting the rotation of the contact printing drum 16 for a second contact printing, the signal processing unit 51 controls the current $I_2$ supplied to the reel block motors $M_3$ and $M_4$ in accordance with the following formula (4)

$$I_2 \alpha \{(T_E + T_O + (k_1 + A_1) \times a\} \qquad \ldots (4)$$

on the basis of the acceleration constant $k_1$ for the first contact printing and the corrective value $A_1$ computed at the time of the first contact printing.

In this manner, each time contact printing of data signals is started, the signal processing unit 51 senses the variable $\Delta\theta_i$ of the angular position of the tension arms 20 and 21 caused by the start of rotation of the contact printing drum 16, and computes the corrective value $A_i$ associated with this variable.

On the side of the supply reel 13, this corrective value $A_i$ assumes a positive value or a negative value when the above variable $\Delta\theta_i$ indicates an increase or decrease, respectively, in the tape tension of the tape 12. On the other hand, on the side of the take-up reel 14, the corrective value $A_i$ assumes a negative value or a positive value when the variable $\Delta\theta_i$ indicates an increase or decrease, respectively, in the tape tension of the tape 12.

When starting the rotation of the contact printing drum 16, at the time of starting of the n'th contact printing, the signal processing unit 51 controls the current $I_n$ supplied to the reel disc motors $M_3$ and $M_4$ in accordance with the following formula (5)

$$I_n \alpha \{T_E + T_O + (k_{(n-1)} + A_{(n-1)}) \times a\} \qquad \ldots (5)$$

on the basis of the acceleration constant $k_{(n-1)}$ and the corrective value $A_{(n-1)}$ based on the variable $\theta_{(n-1)}$ of the angular position of each tension arm at the time of the (n−1)th contact printing. Thus the current $I_n$ supplied to the reel disc motors $M_3$ and $M_4$ is expressed by the following formula (6):

$$I_n \alpha \left\{ T_E + T_O + \left( k_1 + \sum_{i=1}^{n-1} A_i \right) \times a \right\} \qquad (6)$$

Thus the controller 50 controls the reel disc motors $M_3$ and $M_4$ for the copy tape 12 in the above described manner to correct the acceleration coefficient k with changes in the outside diameter of the tape wound on the reels 13 and 14 to maintain the tension on the tapes 6 and at a satisfactory level at all times.

From the foregoing it is seen that the present invention provides a magnetic tape contact printing device wherein a controller controls the rotation of the reels wound with the tapes on the basis of the tension of each tape and the rotational acceleration of the rotational drum driving the tapes. Thus, when the rotational drum is accelerated or decelerated rapidly, each reel may be rotated rapidly to maintain the tape tension at a predetermined value.

Thus the present invention provides a magnetic tape contact printing device in which, even when the rotational drum adapted to feed the tape is adapted to be accelerated or decelerated rapidly at the time of starting or stopping of the drum to effect high speed and efficient contact printing of data signals, the tape tension may be maintained at a predetermined value to prevent tape destruction, such as breakage.

I claim:

1. A tension controller for a contact printing apparatus comprising:
   a first reel motor for driving a first reel,
   a second reel motor for driving a second reel,
   a third reel motor for driving a third reel,
   a fourth reel motor for driving a fourth reel,
   a drum motor for driving a drum,
   a mother tape wound about and adapted to run between said first reel and said second reel,
   a copy tape wound about and adapted to run between said third reel and said fourth reel,
   a rotational transfer drum driven directly by said drum motor and on which said mother tape and said copy tape are driven together so that said rotational transfer drum determines acceleration, deceleration, and travelling speed of said mother tape and said copy tape,
   drum speed sensor means attached to said rotational transfer drum for deriving the acceleration of said rotational transfer drum,
   a tension sensor cooperating at least with said copy tape between said rotational transfer drum and said fourth tape reel for deriving a tape tension thereof, and
   means for supplying a driving current to said fourth motor based on said detected tape tension and for changing said driving current in response to the acceleration of said rotational transfer drum detected by said drum speed sensor means.

2. A tension controller according to claim 1 further comprising a tape diameter detector cooperating with said copy tape wound on said fourth tape reel to detect the diameter thereof, said derived acceleration being corrected on the basis of said detected diameter of the copy tape wound on said fourth reel.

3. A tension controller according to claim 1 further comprising:
    a second tension sensor cooperating with said copy tape between said rotational transfer drum and said third tape reel for deriving a tape tension thereof, and
    means for supplying a driving current to said third motor based on said detected tape tension from said second tape tension sensor and said acceleration of said rotational transfer drum.

4. A tension controller according to claim 3 further comprising a second tape diameter detector cooperating with said copy tape wound on said third tape reel to detect the diameter thereof, said derived acceleration being corrected on the basis of said detected diameter of the copy tape wound on said third reel.

5. A tension controller according to claim 1 further comprising:
    a third tension sensor cooperating with said mother tape between said rotational transfer drum and said second tape reel for deriving a tape tension thereof, and
    means for supplying a driving current to said second motor based on said detected tape tension from said third tape tension sensor and said acceleration of said rotational transfer drum.

6. A tension controller according to claim 1 further comprising:
    a fourth tension sensor cooperating with said mother tape between said rotational transfer drum and said first tape reel for deriving a tape tension thereof, and
    means for supplying a driving current to said first motor based on said detected tape tension from said fourth tape tension sensor and said acceleration of said rotational transfer drum.

7. A tension controller for a contact printing apparatus comprising:
    a first reel motor for driving a first reel,
    a second reel motor for driving a second reel,
    a third reel motor for driving a third reel,
    a fourth reel motor for driving a fourth reel,
    a drum motor for driving a drum,
    a mother tape wound about and adapted to run between said first reel and said second reel;
    a copy tape wound about and adapted to run between said third reel and said fourth reel,
    a rotational transfer drum driven directly by said drum motor and on which said mother tape and said copy tape are driven together and which determines acceleration, deceleration, and travelling speed of said mother tape and said copy tape,
    drum sped sensor means attached to said rotational transfer drum for deriving the acceleration of said rotational transfer drum,
    a first tension sensor cooperating with said copy tape between said rotational transfer drum and said fourth tape reel for deriving a tape tension thereof,
    a second tension sensor cooperating with said copy tape between said rotational transfer drum and said third tape reel for deriving a tape tension thereof,
    a third tension sensor cooperating with said mother tape between said rotational transfer drum and said second tape reel for deriving a tape tension thereof,
    a fourth tension sensor cooperating with said mother tape between said rotational transfer drum and said first tape reel for deriving a tape tension thereof,
    a first tape diameter detector cooperating with said copy tape wound on said fourth tape reel to detect the diameter thereof,
    a second tape diameter detector cooperating with said copy tape wound on said third tape reel to detect the diameter thereof, and
    means for supplying a driving current to said fourth motor based on said detected tape tension between said rotational transfer drum and said fourth tape reel, for supplying a driving current to said third motor based on said detected tape tension between said rotational transfer drum and said third tape reel, for supplying a driving current to said second motor based on said detected tape tension between said rotational transfer drum and said second tape reel, and for supplying a driving current to said first motor based on said detected tape tension between said rotational transfer drum and said first tape reel, each of said driving currents being modified in accordance with the acceleration of said rotational transfer drum detected by said drum speed sensor means, and
    said driving currents to said fourth and third motors being further corrected on the basis of said detected diameter of the copy tape wound on said fourth and third reels, respectively.

* * * * *